United States Patent
Gravier

(10) Patent No.: US 6,629,587 B2
(45) Date of Patent: Oct. 7, 2003

(54) PLASTIC SPRING-LOADED PISTON WITH INSERT

(75) Inventor: Damien Gravier, Munich (DE)

(73) Assignee: Knorr-Bremse Systeme fuer Nutzfahzeuge, Munich (DE)

( * ) Notice: Subject to any disclaimer, the term of this patent is extended or adjusted under 35 U.S.C. 154(b) by 0 days.

(21) Appl. No.: 10/178,777

(22) Filed: Jun. 25, 2002

(65) Prior Publication Data

US 2003/0075397 A1 Apr. 24, 2003

(30) Foreign Application Priority Data

Jun. 25, 2001 (DE) .......................................... 101 30 542

(51) Int. Cl.[7] .............................................. F16D 65/24
(52) U.S. Cl. ........................................................ 188/170
(58) Field of Search ........................... 91/369 A, 376 R; 60/552, 554, 565; 92/248, 129, 187, 254; 303/114.1, 114.3, 155; 188/170, 72.3

(56) References Cited

U.S. PATENT DOCUMENTS

| | | | |
|---|---|---|---|
| 4,354,423 A | * | 10/1982 | Ohmi et al. ............... 91/369 A |
| 4,831,916 A | * | 5/1989 | Leigh-Monstevens et al. .......................... 92/129 |
| 6,085,636 A | * | 7/2000 | Ruckert et al. ................ 92/254 |
| 6,382,367 B1 | * | 5/2002 | Varzescu et al. ........... 188/72.7 |
| 6,446,537 B1 | * | 9/2002 | Tsubouchi et al. ........ 91/376 R |

FOREIGN PATENT DOCUMENTS

DE            19830154     * 1/1999

* cited by examiner

*Primary Examiner*—Christopher P. Schwartz
(74) *Attorney, Agent, or Firm*—Crowell & Moring LLP

(57) ABSTRACT

A spring-loaded piston is produced from plastic, particularly by injection molding. The spring-loaded piston is developed in the area of a connection to a piston or piston rod such that tilting of the spring-loaded piston with respect to the piston rod is prevented and a sufficiently firm connection is ensured. In addition, the spring-loaded piston 1 may include a reinforcing insert by which clearly higher forces can be transmitted while maintaining smaller wall thicknesses than in conventional spring-loaded pistons. Also, the seat or contact surface in the spring-loaded piston is constructed for supporting the preloaded spring such that possibly occurring radial forces do not have any negative influence on the functionality of the spring-loaded piston.

10 Claims, 2 Drawing Sheets

PLASTIC SPRING-LOADED PISTON WITH INSERT

CROSS-REFERENCE TO RELATED APPLICATIONS

This application is related to U.S. patent application Ser. No. 10/178,779, entitled "Plastic Spring-Loaded Piston".

BACKGROUND AND SUMMARY OF THE INVENTION

The present invention relates to a spring-loaded piston for spring-loaded brake cylinders, particularly for brake cylinders of commercial vehicles.

Service brake cylinders, spring-loaded brake cylinders as well as combined service brake and spring-loaded brake cylinders, frequently called "combination cylinders" are known from practice. Brake cylinders of this type are used for the operation of brake systems of vehicles, particularly of commercial vehicles. In the case of known pure spring-loaded brake cylinders, a prestressed preloaded spring acts by way of a spring-loaded piston upon a piston rod, so that a brake can be operated in an application. The service brake part of a service brake cylinder or of a combination cylinder, in the case of brake cylinders known from practice, generally contains a diaphragm which can be acted upon by compressed air and which acts with respect to a plate and an operating tappet connected with the plate. In the case of a combination cylinder, the spring-loaded brake part is saddle-mounted on the service brake part. Such a saddle-mounted spring-loaded brake part is described, for example, in German Patent document DE 198 30 154 A1. Here, a piston rod of the spring-loaded brake part, which is connected with the spring-loaded piston, acts upon the diaphragm of the service brake cylinder when actuated by the preloaded spring and transmits via the plate of the service brake cylinder, the spring-loaded brake force upon the operating tappet. For this purpose, the preloaded spring is tensioned beforehand when the spring-loaded chamber is acted upon by compressed air.

Such spring-loaded brake cylinders have a spring-loaded piston cast of aluminum or zinc. However, these cast components have the significant disadvantage that, after the casting, finishing steps are always required for the removal of possible burrs or for evening-out the surfaces. Furthermore, frequently required bores for fastening devices have to be made, for example, in a cutting manner, or seat surfaces for sealing rings or slide rings or the like have to be worked-in. Also, these spring-loaded pistons made of aluminum or zinc have the disadvantage that, as a result of not completely avoidable moisture, they are subjected to corrosion or similar aging processes, which may finally lead to a malfunctioning. Finally, the manufacturing of spring-loaded pistons as an aluminum or zinc casting is relatively expensive, and it is another disadvantage that the casting molds are subjected to high wear, and therefore only limited quantities can be produced.

Spring-loaded pistons made of aluminum or zinc castings in accordance with known practices have the additional disadvantage that only limited forces can be introduced by the preloaded spring into the spring-loaded piston and be transmitted by the spring-loaded piston to a piston or a piston rod because, as known, aluminum or zinc castings can be placed in tension stress only to a limited extent.

It is therefore an object of the present invention to provide a spring-loaded piston which can be produced at lower cost without any significant finishing expenditures. In addition, it should be possible to minimize the above-mentioned corrosion and aging risks.

It is another object of the present invention to provide suitable devices so that either higher forces than previously could be transmitted from the preloaded spring into the spring-loaded pistons and from the latter to the piston rod, or, while the forces remain the same, the wall thickness of the force-loaded wall sections of the spring-loaded piston can be reduced.

These objects are achieved by a spring-loaded piston for a spring-loaded brake cylinder, particularly of commercial vehicles, wherein the spring-loaded piston is made of plastic.

According to the invention, a plastic is selected as the material for producing the spring-loaded piston. Contrary to existing prejudices with respect to plastic as a material considered useless for spring-loaded pistons in comparison to aluminum and zinc, tests have surprisingly shown that spring-loaded pistons made of plastic can have operating characteristics which are just as good as those of conventional spring-loaded pistons. Also surprisingly, the braking forces achieved thereby are no less than the braking forces achievable using the conventional spring-loaded pistons. Furthermore, the expected useful life of a spring-loaded piston made of plastic is against all expectations even above the expected useful life of a conventional spring-loaded piston.

In that a spring-loaded piston made of plastic is suggested for the first time, which can be made, for example, as a plastic injection molded part, the clearly higher quantities that can be made by a plastic injection mold can be advantageously utilized for increasing productivity, in which case rates of increase of 10 to 20 times in comparison to the conventional aluminum or zinc castings can be implemented without additional expenditures. Furthermore, when the spring-loaded piston is made of plastic, a high-expenditure finishing can, as a rule, be eliminated. Plastic injection molded parts have smooth surfaces from the start. Burrs, which have to be removed subsequently at high expenditures, normally do not occur in the case of plastic injection molded parts. The manufacturing costs of a spring-loaded piston made of plastic can therefore clearly be reduced in comparison to the manufacturing costs of conventional spring-loaded pistons cast of aluminum or zinc.

Furthermore, the first-time selection of plastic as the material for producing the spring-loaded piston according to the invention has the additional advantage that a spring-loaded piston made of plastic has greater useful life and is resistant to corrosion that may occur because of possibly existing moisture.

In addition, the use of plastic for producing the spring-loaded piston also has the additional advantage of a clear weight reduction in comparison to the aluminum or zinc casting technology. This reduces the expenditures with respect to handling during the manufacture of a spring-loaded piston produced as an injection molded part of a plastic and contributes to lower transport costs of the produced parts because of their smaller measurements.

Furthermore, a spring-loaded piston made of plastic has the additional advantage that seats for sliding rings, seals, or the like have a sufficiently high surface quality and/or fitting precision so that the working-in of such fitting surfaces for sliding rings, seals or the like, which is expensive specifically in the case of conventional aluminum or zinc castings, can be eliminated. This, in turn, is reflected in reduced machining time as well as in lowering of costs.

Not least, the manufacturing of a plastic spring-loaded piston according to the invention permits a noticeable noise reduction during the further machining since its hollow plastic body does not produce any significant noise in contrast to a metallic hollow body. This circumstance is particularly noticeable by the workers entrusted with the integration of the brake cylinder, in that the workplace quality is improved.

Advantageous further developments of the invention are described herein.

Thus, in a preferred embodiment, a spring-loaded piston according to the invention has an insert, which is preferably molded in the same process into the wall or into wall sections of the spring-loaded piston and which is made, for example, of steel or a similar suitable material which can be well stressed with respect to tension without having significant deformations. This reinforcing insert or steel insert is largely integrated in the wall of the spring-loaded piston made of plastic and is therefore surrounded by plastic. The steel insert is advantageously used for the reinforced transmission of the force introduced by the preloaded spring into the spring-loaded piston to its transfer area for the introduction or transfer into the piston rod, in which case the steel insert can be shaped in an optimal manner according to its mechanical loads. In addition, such a reinforcing insert or steel insert has the advantage that the wall thickness of wall sections, which are under tension, of the spring-loaded piston according to the invention can clearly be reduced in comparison to conventional spring-loaded pistons made of aluminum or zinc castings.

According to a preferred embodiment, the insert extends from a piston plate section, particularly from a force introduction area into the spring-loaded piston, which is adjacent to a contact surface of a preloaded spring, to a force transfer area from the spring-loaded piston to a piston or a piston rod, which force transfer area is arranged in a ring-shaped piston center. In this case, the insert may extend in this section, for example, in a full-surface ring-shaped surrounding manner, but it may also be embedded in the respective wall section as mutually spaced, radially extending strips. Likewise, it is possible to construct the insert similar to a crown with a ring and adjoining rays and to mold it into the wall.

In another preferred embodiment, the reinforcing insert is curved in an arched manner in the force introduction area of the preloaded spring, then extends in a relatively straight line (or inclined at a slight angle) ring-shaped coaxially to the longitudinal axis X, and then bends away in one or several sections to a ring-shaped end section oriented essentially perpendicular to the longitudinal direction, against which end section the piston rod rests for receiving the force. In this case, the piston rod is preferably centered in its position by a corresponding nose which engages the inside of the piston rod. In a preferred embodiment, the insert has a shoulder for this purpose, the spring-loaded-piston-side radially interior end of the piston or of the piston rod resting against this shoulder.

Other objects, advantages and novel features of the present invention will become apparent from the following detailed description of the invention when considered in conjunction with the accompanying drawings.

DETAILED DESCRIPTION OF THE DRAWINGS

Figure 1:
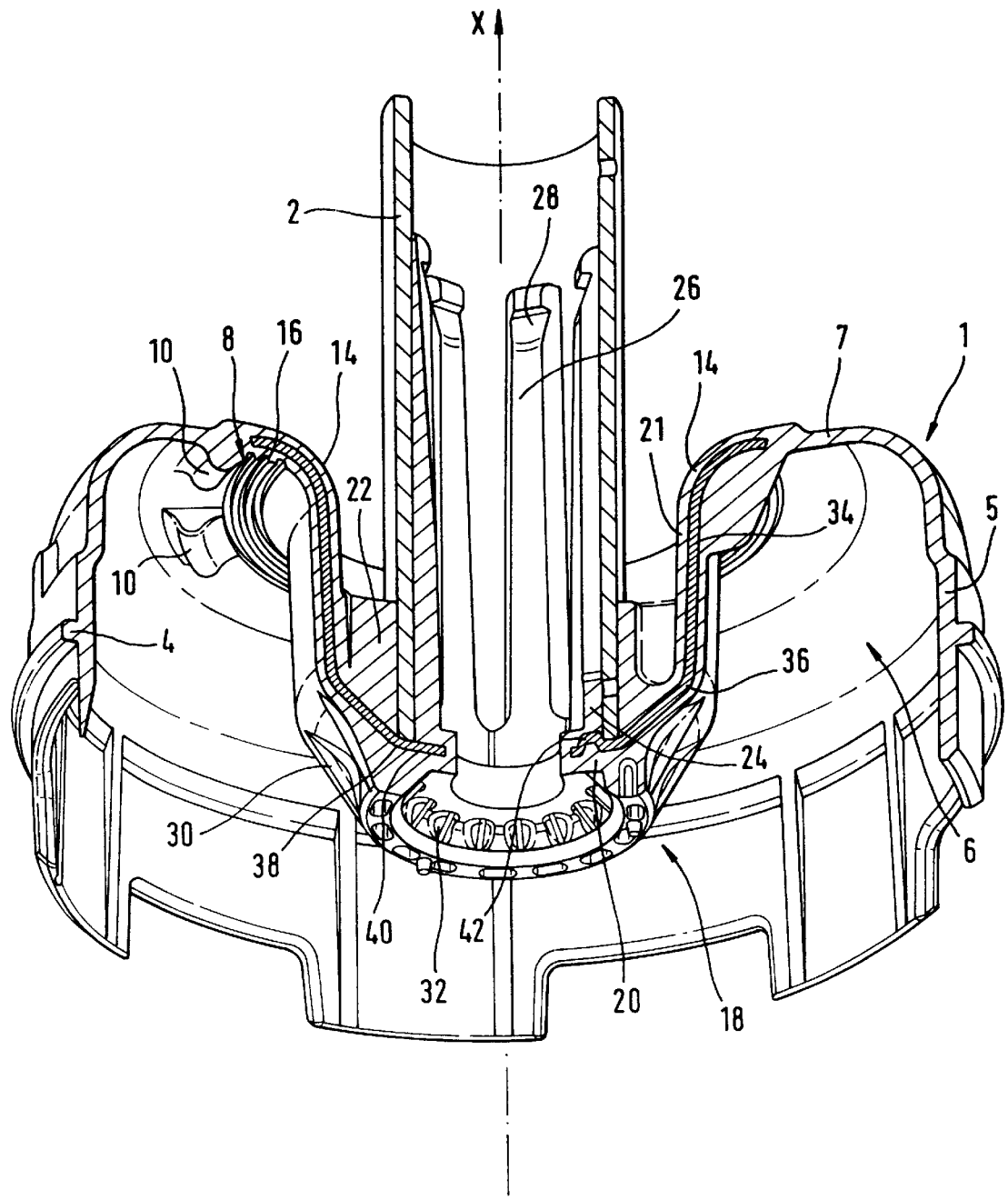
FIG. 1 is a three-dimensional, cut-open lateral view of a spring-loaded piston according to the invention with a piston rod integrated therein.

FIG. 1 is a three-dimensional sectional view of an embodiment, shown as an example, of spring-loaded piston 1 according to the invention. The spring-loaded piston 1 produced of plastic has an inserted piston rod 2, whose length may be adapted according to the required stroke and which may be produced of a suitable material, such as aluminum or zinc or, for example, as an extruded part made of plastic. A web 4 constructed as an outward protuberance extending around the piston in a ring-shaped manner is visible at the outer circumference of the spring-loaded piston 1. The web 4 can be used as a shoulder for supporting a slide ring (not shown in detail) or can, for example, itself operate as a slide ring. Furthermore, sealing devices, which are not shown in detail, may be supported against the web 4, if required. The radially exterior, surrounding section of the spring-loaded piston wall can therefore also be called a guide section 5. Inside the ring-shaped cavity 6 of the spring-loaded piston 1 radially bounded by the guide section 5, which cavity 6 is bounded in the axial direction X in turn by the so-called piston plate section 7, a preloaded spring is situated (which is not illustrated in detail in FIG. 1). The last turn of the preloaded spring is supported against a bearing area or a bearing surface 8 of the plate section 7. For diverting radial forces of the preloaded spring (which is not shown in detail), humps, shoulders, or shoulder sections 10 are provided which project into the interior of the spring-loaded piston 1 and therefore face the cavity 6. Also, in this embodiment, the bearing surface 8 has a profiled construction.

Figure 2:
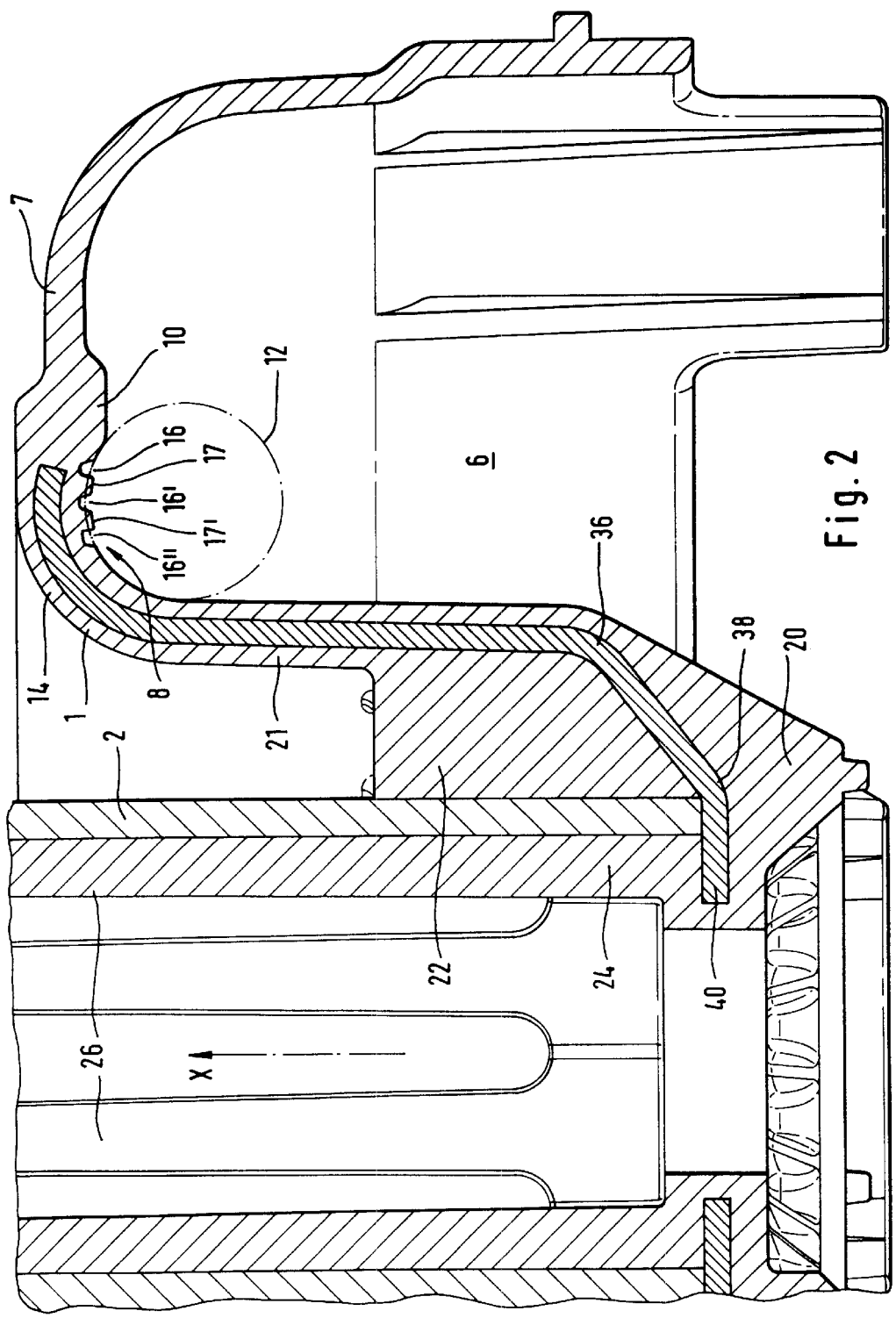
FIG. 2 is a sectional enlarged view of the center area of the spring-loaded piston illustrated in FIG. 1.

As illustrated particularly in FIG. 2, which is an enlarged detail of FIG. 1, the last turn of the preloaded spring 12 (illustrated there as a sectional view), rests radially on the inside against the curved contour 14 of the spring-loaded piston 1. In addition, the last turn of the preloaded spring 12 rests radially on the outside against the shoulder 10. In the axial direction X of the spring-loaded piston 1, the preloaded spring 12 rests form-fittingly against the interior contour of the spring-loaded piston 1, the contact surface 8 being profiled in this area. In the embodiment illustrated here, the contact surface 8 has three grooves 16, 16' and 16" extending in a ring-shaped surrounding manner (see FIG. 1 as well), between which grooves 16, 16' and 16", the webs 17 and 17', respectively, are situated. The webs protrude into the contour of the adjoining preloaded spring 12 and are preferably deformable, which permits an adaptation of the contact surface 8 to the contour of the preloaded spring during the running-in of the spring-loaded brake cylinder. In this manner, it is ensured that the radial forces of the preloaded spring, which are known from conventional spring-loaded pistons and can normally not be completely avoided, can be diverted into the spring-loaded piston 1 at least such that no negative effects need to be feared on the sealing devices, which are normally stressed only slightly in the radial direction. Or, in the ideal case, a generating of these radial forces is largely avoided.

In FIG. 1, the inner section of the spring-loaded piston 1, which receives a piston or the piston rod 2, is marked as area 18. This area has a seat 20, which extends in a surrounding manner in a ring shape. The seat 20 changes radially toward the outside into the piston wall that surrounds the preloaded spring, which piston wall is sometimes also called a piston shirt. The radial inner section of this piston wall has the reference number 21. The piston rod 2 is supported against the ring-shaped seat 20. In this case, the piston rod 2 is held from the outside by a ring-shaped shoulder 22. Another ring-shaped shoulder 24 supports the piston rod 2 from the inside. The inner shoulder 24 is adjoined by tongues or lugs 26, which are molded on in one piece and which extend in the axial direction X. In the embodiment illustrated here, six of such lugs 26 are provided. Instead of these lugs 26, a tube-shaped extension of the ring-shaped shoulder 24 may be provided. However, the lugs 26 have the advantage that material can be saved and they can generate a certain elastic prestress. Inside the cavity defined by the piston rod 2 and the lugs 26, a release device can be integrated (not shown in detail). This release device can then be supported against the recesses 28 of the lugs 26. The recesses 28 can also be used as abutments for tensioning devices. For reinforcing the ring-shaped seat 20, the seat 20 has radially oriented inner as well as outer supporting ribs 30 and 32, respectively.

In the embodiment of a spring-loaded piston 1, which is illustrated of an example, in FIG. 1 as well as in FIG. 2 (enlarged cutout of FIG. 1), an insert 34 is provided for reinforcing the piston shirt. The reinforcement 34 may be produced of a material which can be stressed particularly well under tension, such as steel or the like, to form, for example, a steel insert. In this case, the insert 34 follows the contour of the piston shirt. It starts with a bent curve in the area of the corresponding bent contour 14 of the wall of the spring-loaded piston 1 and then extends there subsequently approximately concentric to the longitudinal direction or main axial direction of the spring-loaded piston 1 or at a certain angle slightly inclined thereto, and then bends away in a first area 36 by approximately 45°, in order to bend into another section 38 again by approximately 45° and end in a ring-shaped section 40. With the exception of small partial areas, the insert 34 will be almost completely enclosed by the wall of the spring-loaded piston 1, particularly by the wall of the piston shirt.

During the manufacturing of the spring-loaded piston 1, plastic material is sprayed around the insert 34. In the end area 40 in which the insert 34 ends in the support 20, the steel insert 34 has at least one nose-type protuberance or shoulder 42, which is used for centering the piston rod 2. The piston rod 2 is supported in the spring-loaded piston 1 on the face-side against the end section 40 of the steel insert 34. A force introduced by the preloaded spring 12 in the bearing area 8 is transmitted by way of the piston shirt and the steel insert 34 integrated therein into the ring-shaped seat 20 and is transmitted by the latter to the piston rod 2.

A tilting of the spring-loaded piston 1 with respect to the piston rod 2 is excluded by the integration of the piston rod 2 within the ring-shaped shoulder 22 and of the second ring-shaped shoulder 24 as well as the lugs 26. The outer contour or the guide section 5, the piston plate section 7 as well as the piston shirt of the spring-loaded piston 1 are produced with the ring-shaped shoulder 22 and the ring-shaped shoulder 24 as well as the lugs 26 from one piece of plastic, which is indicated in FIG. 1 as well as FIG. 2 by the use of a uniform hatching.

The present invention therefore creates for the first time a spring-loaded piston which is manufactured, for example, by injection molding of plastic. Furthermore, in the area of the connection to the piston rod, the spring-loaded piston according to the invention is further developed such that a tilting of the spring-loaded piston with respect to the piston rod is substantially prevented, and a firm connection is ensured between the spring-loaded piston and the piston rod. In addition, the spring-loaded piston according to the invention has a reinforcing insert, by which clearly higher forces can be transmitted in the case of smaller wall thicknesses than in the case of conventional spring-loaded pistons. Not least, the seat or the bearing surface in the spring-loaded piston for supporting the preloaded spring is constructed such that radial forces potentially occurring have no negative influence on the functionality of the spring-loaded piston.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring-loaded piston for a spring-loaded brake cylinder of a commercial vehicle, comprising:
   a molded plastic piston wall; and
   an insert molded into the molded plastic piston wall when the molded plastic piston wall is molded.

2. The spring-loaded piston according to claim 1, wherein the plastic piston wall includes a piston plate section having a contact surface;
   wherein a force transfer area is arranged in a ring shape at a center of the spring-loaded piston; and
   wherein the insert extends from the piston plate section to the force transfer area.

3. The spring-loaded piston according to claim 2, wherein the insert extends from a force introduction area adjacent a contact surface adapted to receive a pre-loaded spring in the piston plate section to the force transfer area.

4. The spring-loaded piston according to claim 3, wherein the insert is a steel insert.

5. The spring-loaded piston according to claim 2, wherein the insert includes a shoulder on which a radially interior end of a piston or piston rod is adapted to rest.

6. The spring-loaded piston according to claim 2, wherein the insert is a steel insert.

7. The spring-loaded piston according to claim 1, wherein the insert includes a shoulder on which a radially interior end of a piston or piston rod is adapted to rest.

8. The spring-loaded piston according to claim 7, wherein the insert is a steel insert.

9. The spring-loaded piston according to claim 1, wherein the insert is a steel insert.

10. A method of manufacturing a spring-loaded piston for a spring-loaded brake cylinder of a commercial vehicle, the method comprising the acts of:
    injection molding a plastic spring-loaded piston wall; and
    simultaneously molding an insert into the plastic spring-loaded piston wall.

* * * * *